United States Patent [19]

Hira

[11] Patent Number: 5,392,264
[45] Date of Patent: Feb. 21, 1995

[54] INFORMATION REPRODUCING APPARATUS

[75] Inventor: Osamu Hira, Tokorozawa, Japan

[73] Assignee: Pioneer Electronic Corporation, Tokyo, Japan

[21] Appl. No.: 50,872

[22] Filed: Apr. 20, 1993

[30] Foreign Application Priority Data

Apr. 24, 1992 [JP] Japan .................................. 4-107095

[51] Int. Cl.⁶ .............................................. G11B 17/22
[52] U.S. Cl. ........................................ 369/32; 369/47; 369/30
[58] Field of Search ...................... 369/32, 30, 33, 178, 369/47, 48, 54

[56] References Cited

U.S. PATENT DOCUMENTS

| | | | |
|---|---|---|---|
| 4,862,439 | 8/1989 | Ando et al. | 369/30 |
| 4,873,586 | 10/1989 | Ishikawa et al. | 369/30 |
| 5,134,598 | 7/1992 | Nagano | 369/32 |
| 5,195,066 | 3/1993 | Amemiya et al. | 369/32 |
| 5,263,010 | 11/1993 | Amemiya et al. | 369/32 |

Primary Examiner—Robert J. Pascal
Assistant Examiner—Tan Dinh
Attorney, Agent, or Firm—Kane, Dalsimer, Sullivan, Kurucz, Levy, Eisele, and Richard

[57] ABSTRACT

An information reproducing apparatus, to which a recording medium having record information and table of contents information is mounted, controls a reproduction operation on the basis of the table of contents information. The apparatus includes: an operation input device by which various command data are inputted; a first memory for temporarily storing reproduction control information including the table of contents information; a reproduction device for reproducing the recording medium according to the inputted command data; a second memory of non-volatile type for storing the reproduction control information in correspondence with each recording medium; and a memory control device for storing into the second memory the reproduction control information stored in the first memory the at least one of the inputted command data and an operation condition of the reproduction device indicate a continuous stop condition of the reproduction operation. The reproduction device reproduces the recording medium on the basis of the reproduction control information stored in the first and second memory according to circumstances.

12 Claims, 9 Drawing Sheets

INFORMATION REPRODUCING APPARATUS

BACKGROUND OF THE INVENTION

1. Field of the Invention

The present invention is related with an information reproducing apparatus. Especially, the present invention is related with the information reproducing apparatus which can reproduce continuously two or more recording media such as CDs (Compact Discs), LVDs (Laser Vision Discs), etc. which can be randomly accessed.

2. Description of the Related Art

There is a CD player as an apparatus which reproduces information recorded on the CD.

The CD player is constituted so that it can optically read the information on a rotationally driven CD, by an optical pickup, and can reproduce the record information under the control of a reproduction control device. In such a CD player, the table of contents information (hereinbelow, it is called as TOC (Table Of Contents) information), which is recorded on the CD as a control data with the record information to be reproduced, is read into a RAM (Random Access Memory) in the reproduction control device from the CD, before shifting to the actual reproduction operation. The reproduction control is performed on the basis of this read TOC information. For example, this TOC information includes the peculiar data about the contents of information of the CD, such as the number of music, and performance time.

On the other hand, recently, a multi (multiple) CD player is known, in which a plurality., of CDs as a recording media group, are packed into a single magazine and which can make the reproduction operation possible by the unit of the magazine in order to make the handling of the CDs more convenient. This multi CD player is equipped with an automatic CD exchange device called "auto-changer", which automatically exchanges the CDs to reproduce a CD which is indicated by a program registered manually or in advance by a user, so as to perform the continuous reproduction. Furthermore, there is a multi CD player, which stores to a RAM all of the TOC data of each CD in the magazine and the program data with respect to the magazine in order to raise the operativity, and performs the reproduction control on the basis of thus stored information (refer to Japanese Patent Application (Hei) No. 01-034296).

However, in the above mentioned conventional multi CD player, the storage of the magazine data, such as the storage of the reproduction music order data (program data), the storage of the delete data of the program, and the music genre name data (music type data) about the magazine, is possible only by the storage executing operation by a user's manual input.

For this reason, there is a problem that the handling or operativity is rather bad, in this apparatus. Moreover, in case that the operation of the memory key which is the decision key of the storing operation is forgotten to be operated and other operations have been performed etc., there is another problem that various data, such as the program data and the delete data, should be inputted again.

SUMMARY OF THE INVENTION

It is therefore an object of the present invention to provide an information reproducing apparatus which can reproduce a recording medium in a condition suitable for the recording medium to be reproduced, with little or no necessity of the manual operation input by the user.

According to the present invention, the above mentioned object can be achieved by an information reproducing apparatus, to which a recording medium having record information and table of contents information of the record information is mounted, for controlling a reproduction operation of the record information on the basis of the table of contents information. The information reproducing apparatus includes: a first memory for temporarily storing reproduction control information including the table of contents information for performing the reproduction operation; a reproduction device for reproducing the recording medium on the basis of the reproduction control information stored in the first memory; a second memory of non-volatile type for storing the reproduction control information in correspondence with each recording medium; and a memory control device for storing into the second memory the reproduction control information stored in the first memory, when an operation indication or an operation condition to anticipate a continuous stop condition of the reproduction operation is detected.

According to the present invention, the reproduction device reproduces the recording medium on the basis of the reproduction control information stored in the first memory.

On the other hand, in case that the operation indication or condition by which at least the continuous stop condition of the reproduction operation of the recording medium is predicted or anticipated, is detected during this reproduction operation, the memory control device stores the reproduction control information, which is stored in the first memory, into the second memory of non-volatile type.

Therefore, the reproduction control information with respect to each recording medium, can be stored easily and certainly, and can be used when reproducing the same recording medium at the next time.

In this manner, since the reproducing apparatus can easily store the reproduction control information, such as the operation mode and the program, the reproducing apparatus can continuously reproduce two or more recording media as well as a single recording medium, in a condition suitable for the relevant recording medium being reproduced, with a little or no necessity of the manual operation input by the user.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, an embodiment of the present invention will be now explained.

First Embodiment

Figure 1:
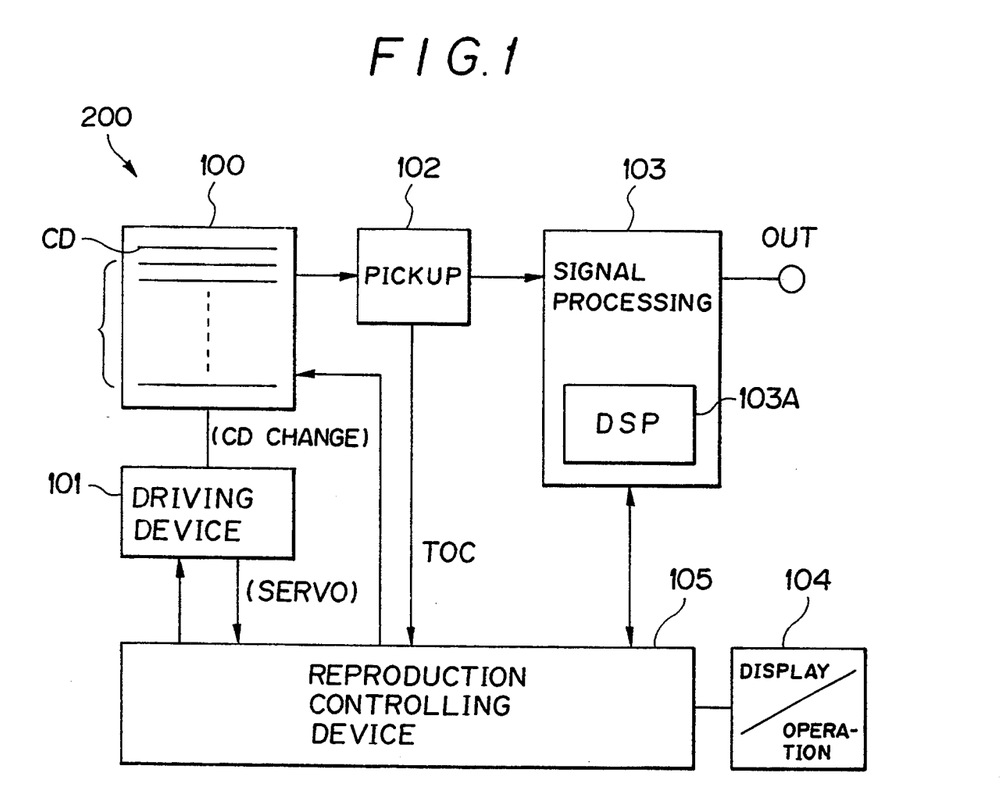
FIG. 1 is a block diagram showing an outline constitution of a multi CD player of an embodiment.

FIG. 1 shows a block diagram of the constitution of a multi CD player.

A multi CD player 200 has a magazine 100 with which two or more CDs are stored or accommodated. The multi CD player 200 exchanges arbitrary CDs in the magazine 100 automatically by a CD changer equipped therein. The multi CD player 200 rotationally drives the exchanged CD, by a driving device 101. The record information on the rotationally driven CD is optically picked up by an optical pickup 102, and is processed by a signal processing unit 103, to be converted to an analog signal and outputted from an output terminal OUT. The overall control of these elements is performed by a reproduction controlling device 105. The optical pickup 102 is adapted to supply the TOC information to the reproduction controlling device 105. The driving device 101 is servo-controlled by the reproduction controlling device 105.

The CD player 200 is also provided with a displaying and operating unit 104, which is adapted to display various data related with the reproduced CD etc., and by which the user can input various commands.

The signal processing unit 103 has a digital signal processor (hereinbelow, it is referred to as a DSP) 103A. By making the reproduced sound resemble the construction of the reflective sound in a musical performance hall (a concert hole, jazz club, etc.), the CD reproduction sound is obtained to give the feeling of concert hall presence as if one would be in the musical performance hall. Here, the mode to operate this DSP, is defined as a "DSP mode". There are a jazz club (JAZZ CLUB) mode, a church (CHURCH) mode, a dance (DANCE) mode, a hole (HALL) mode, a stadium (STADIUM) mode, etc. as the DSP mode. Moreover, a reproduction mode which is one kind of the DSP mode and in which the signal is outputted without any process, is defined as a flat (FLAT) mode.

Figure 2:
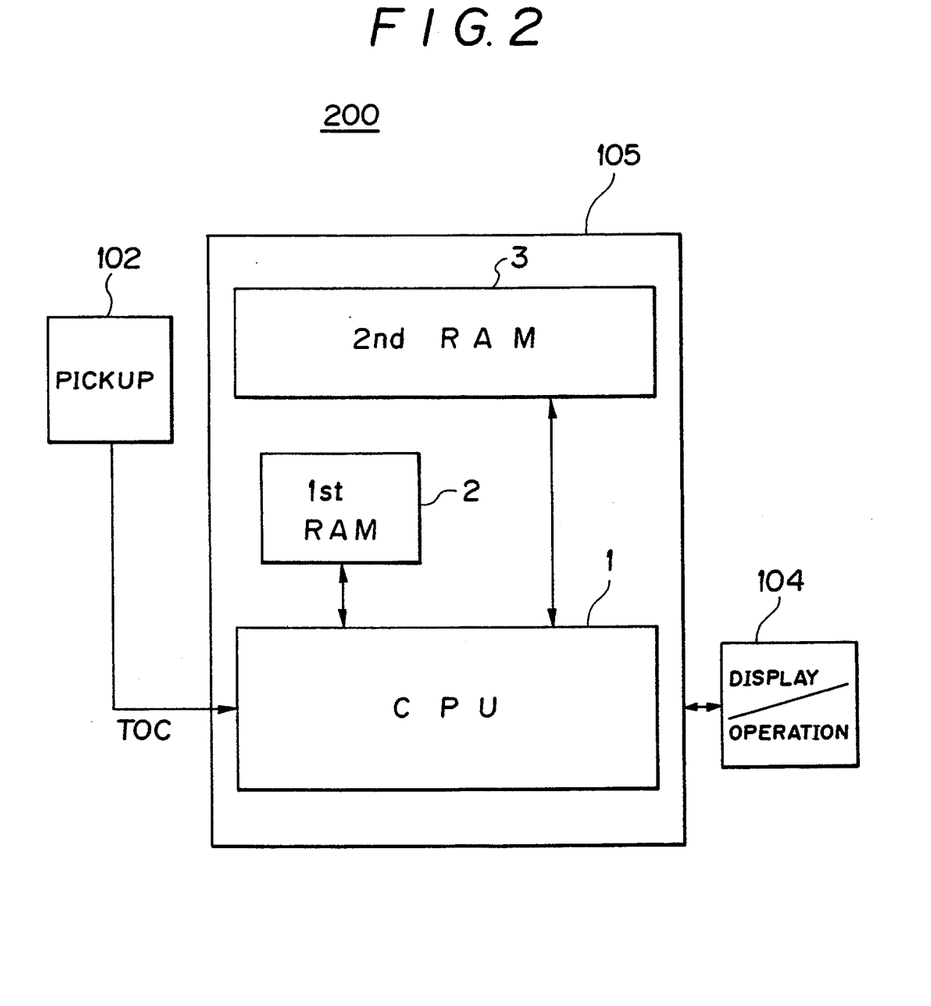
FIG. 2 is a block diagram showing an outline constitution of a reproduction control device in the multi CD player of FIG. 1.

As shown in FIG. 2, the reproduction controlling device 105 in the CD player 200, has a CPU 1, a first RAM 2, and a second RAM 3. The CPU 1 controls the reproduction operation in general. The first RAM 2 stores the various data for controlling. The second RAM 3 has two or more memory areas which store various data for controlling in the same manner.

Figure 3:
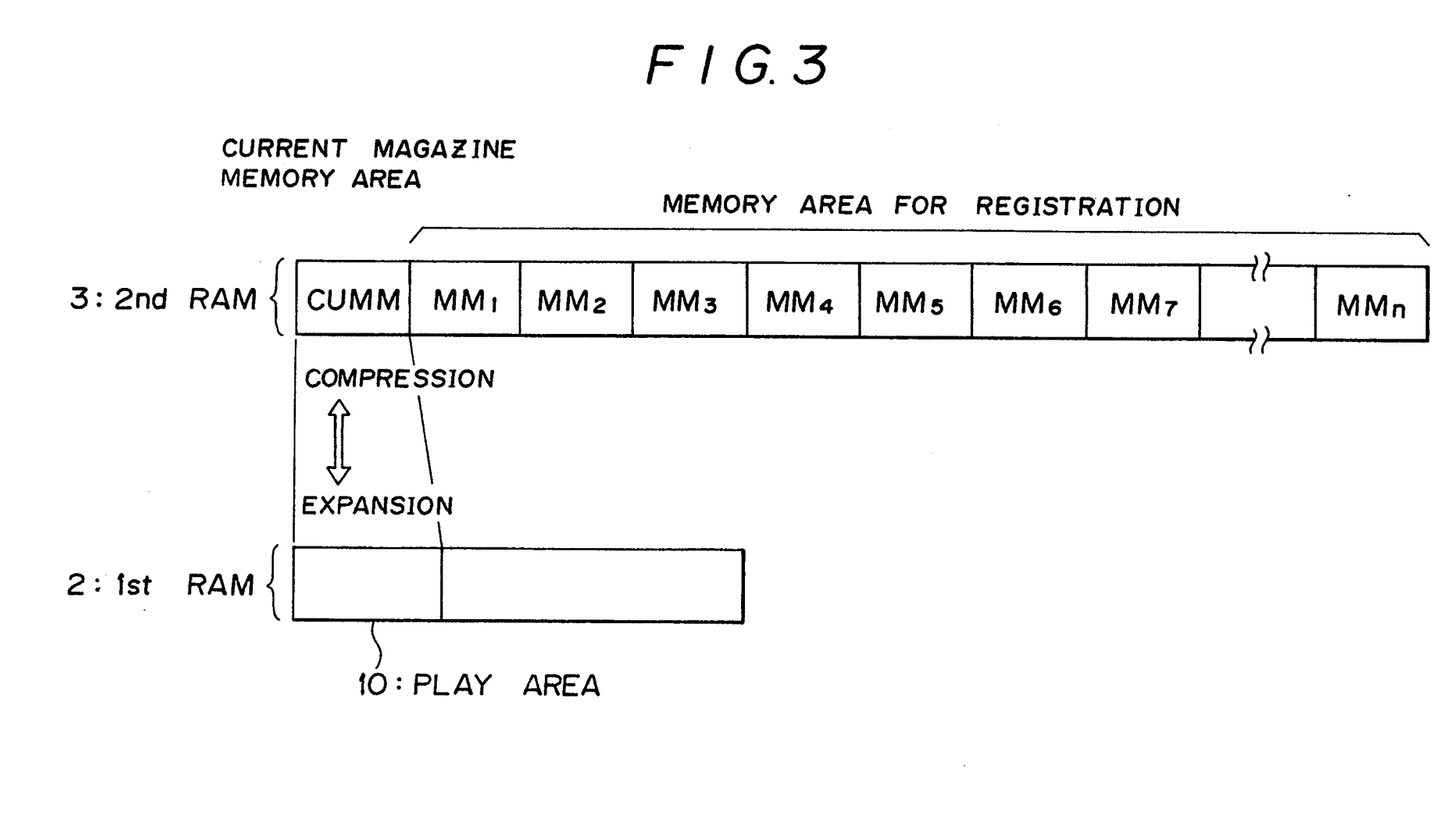
FIG. 3 is a figure for explaining an internal memory state of a RAM in the embodiment.

Nextly, internal constructions of the first RAM 2 and the second RAM 3, will be explained with reference to FIG. 3.

The second RAM 3 has a current magazine area CUMM and a plurality n of memory areas MM1 to MMn for registration. The current magazine area CUMM stores the reproduction control information which is currently selected by the user or automatically selected. Each of the n memory areas MM1 to MMn for registration, has the construction same as the current magazine area CUMM.

The second RAM 3 is the memory of non-volatile type such as an EEPROM, so that the second RAM 3 can store the reproduction control information of various kinds even under the condition where the power supply of the multi CD player is turned off. In addition, the subscripts 1 to n of the memory area MM1 to MMn for registration, indicate the pointer number to specify each memory area for registration.

The first RAM 2 has a play area 10. The play area 10 has a capacity equal to or more than that of the current magazine area CUMM. The play area 10 stores the reproduction control information of the magazine which is currently and actually reproduced, while continually updating it.

Nextly, the structure of the current magazine area CUMM will be explained with reference to FIG. 4.

In this case, in order to distinguish or identify the magazine currently mounted to the multi CD player 200, a part of the TOC information of the CD mounted to the top of the magazine 100, is used as the magazine identifying data ID. A magazine, which has the same magazine identifying data ID, is identified as a magazine to which the same CD is set. This magazine identifying data ID is recorded to the current magazine area CUMM and each of the memory areas MM1 to MMn for registration. Such a control that each reproduction control information for the magazine which is different from each other, is respectively recorded to one of the memory areas MM1 to MMn for registration, is performed by use of the identifying data ID. Therefore, all of the magazine identifying data IDs recorded in the memory areas for registration, are all different from each other. In addition, it is not possible to generate the magazine identifying data ID in the present embodiment with respect to the magazine to which the CD is not set at the first sheet position, so that the above mentioned operation is not performed. Moreover, the same thing can be said as for the single magazine to which only one CD is set and which is adapted to reproduce this.

Figure 4:
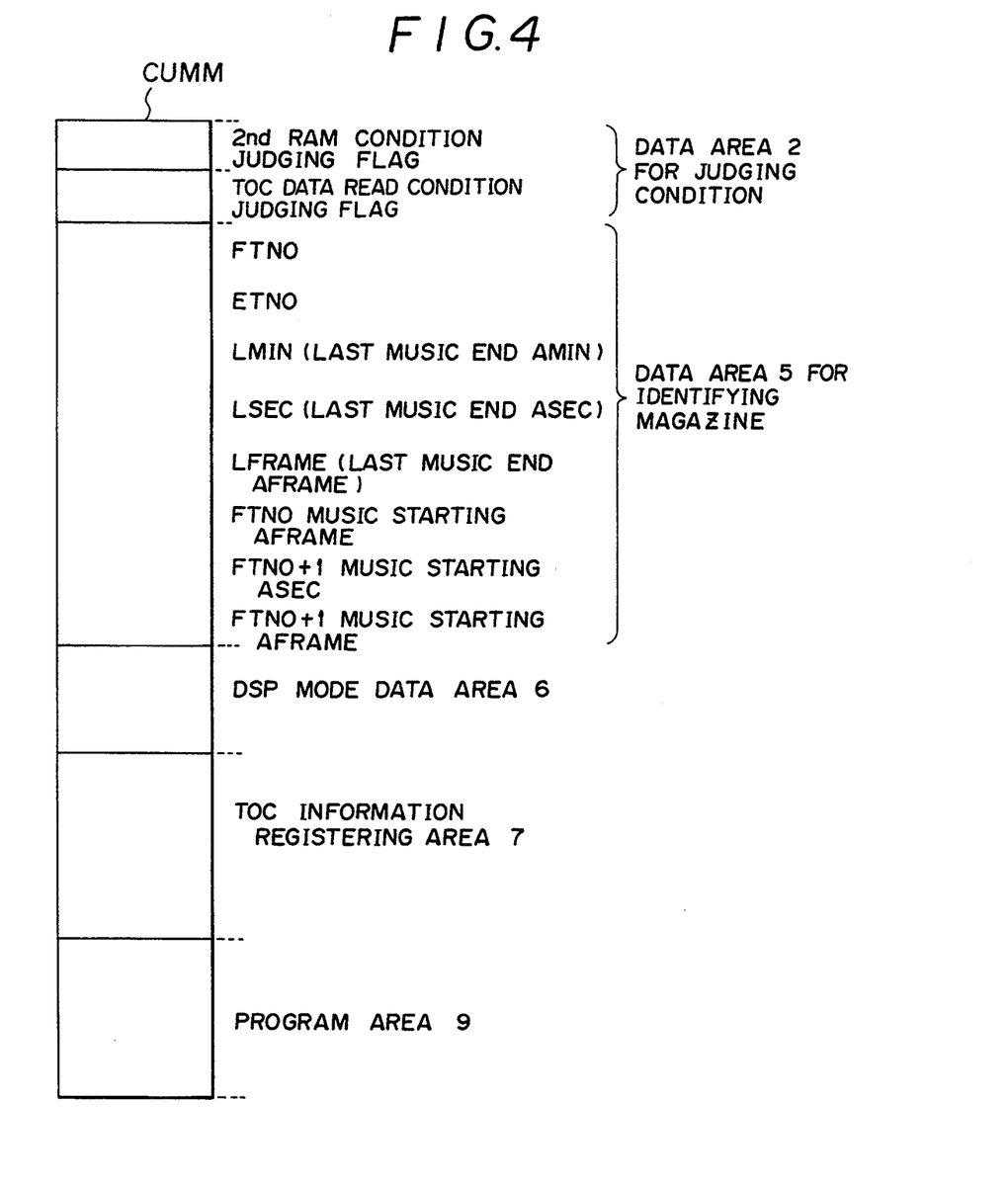
FIG. 4 is a figure for explaining the structure of a current magazine area in the embodiment.

As shown in FIG. 4, the current magazine area CUMM has a data area 4 for judging condition, a data area 5 for identifying magazine, a DSP mode data area 6, a TOC information registering area 7 and a program area 9.

The data area 4 for judging condition has a 2nRAM condition judging flag to judge the using condition of the second RAM 3, and a TOC data read condition judging flag to judge whether the TOC data has been read or not. The data area 5 for identifying magazine, stores the data ID for identifying the magazine. The DSP mode data area 6 stores the DSP mode data. The TOC information registering area 7, stores the TOC data. The program area 9 stores various program data, delete data and music type data.

A number of first or start music FTNO, a number of end music ETNO, a last music end minute LMIN, a last music end second LSEC, a last music end frame LFRAME, a music starting absolute frame (AFRAME) of music corresponding to the first music number FTNO, the music starting absolute minute (ASEC) of music corresponding to the music number (FTNO+1), and a music starting absolute frame (AFRAME) of the music corresponding to the music number (FTNO+1), which function as the data ID on the whole to distinguish the magazine, are stored in the data area 5. The last music end minute LMIN, the last music end second LSEC, and the last music end frame LFRAME, are expressed by the absolute time, respectively.

The reason why such a TOC data is used as the magazine identifying data ID, is that the TOC data has the contents peculiar to each CD, and it is possible to specify the CD by using a certain number of data in the TOC.

Here, the DSP mode is explained.

During the reproduction or the stop, the DSP mode can be selected by the direct key input at the main body side, or, alternatively, the DSP mode can be selected by the DSP mode key input at the remote control device. By depressing the DSP mode key, the mode changes cyclically as: FLAT ⇨ JAZZ CLUB ⇨ CHURCH ⇨ DANCE ⇨ HALL ⇨ STADIUM ⇨ FLAT ⇨ JAZZ CLUB ⇨ . . .

Figure 5:
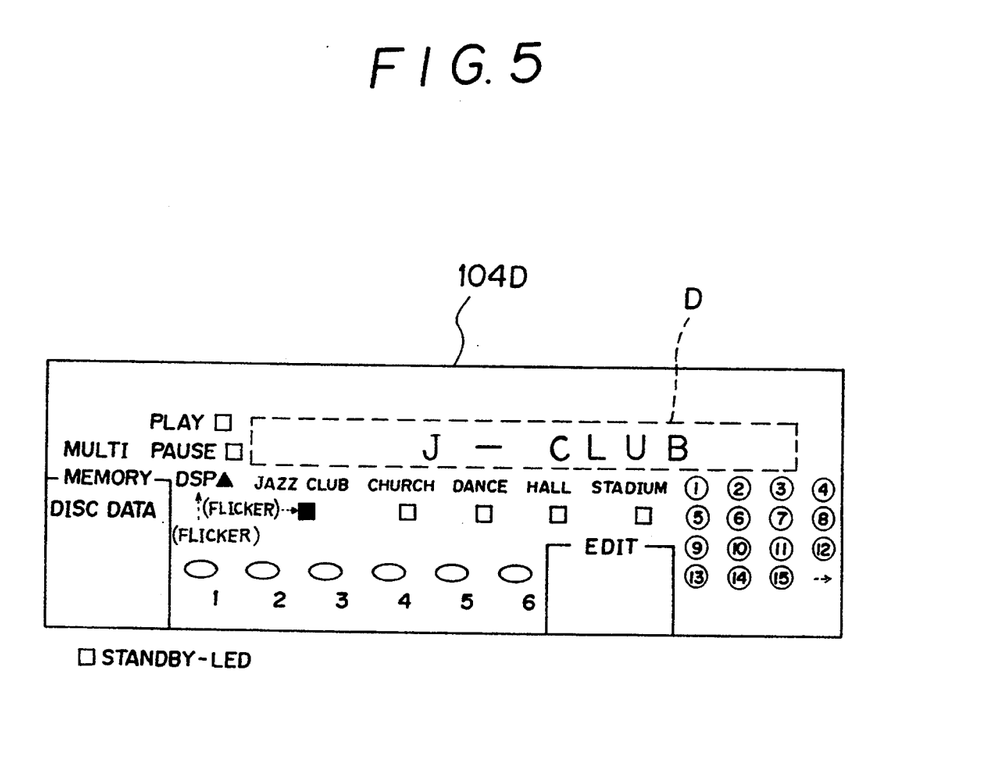
FIG. 5 is a figure (1) for explaining a state of operation in the embodiment.

For example, it is assumed here that the user selects the jazz club mode. Then, as shown in FIG. 5, the DSP mode indication LEDs which are equipped at the character of DSP and below the character of "JAZZ CLUB", are flickered at the display panel 104D of the multi CD player. The character of "J-CLUB" is displayed on the display area D. The jazz club mode is decided as the DSP mode. In this condition, if there is no key input to change the display, the character display returns to its original state, after a predetermined time period (for example, after 5 seconds). The DSP mode indication LED equipped below the character of "JAZZ CLUB", is kept to be flickering.

The DSP mode can be respectively set for every CD. The DSP mode of the CD, which is selected (i.e. displayed) at the time of setting the DSP mode, is automatically recorded to the play area 10. Even if the CD is exchanged after this, if the original CD is set, the stored DSP mode data can be recovered from the play area 10. Moreover, even when the DSP mode has not been yet set with respect to the CD after the CD exchange, if the DSP mode has been set with respect to the CD before the CD exchange, the same DSP mode is assigned to it and stored automatically. More concretely, in case that six CDs are set to the magazine which is to be reproduced for the first time, one type of the DSP mode is set by the first piece of CD. After this, if the reproduction is continued to the sixth CD without newly setting the DSP mode, the DSP mode for each of the five CDs i.e. from the second CD to the sixth CD, is set to the DSP mode of the first CD.

Figure 6:
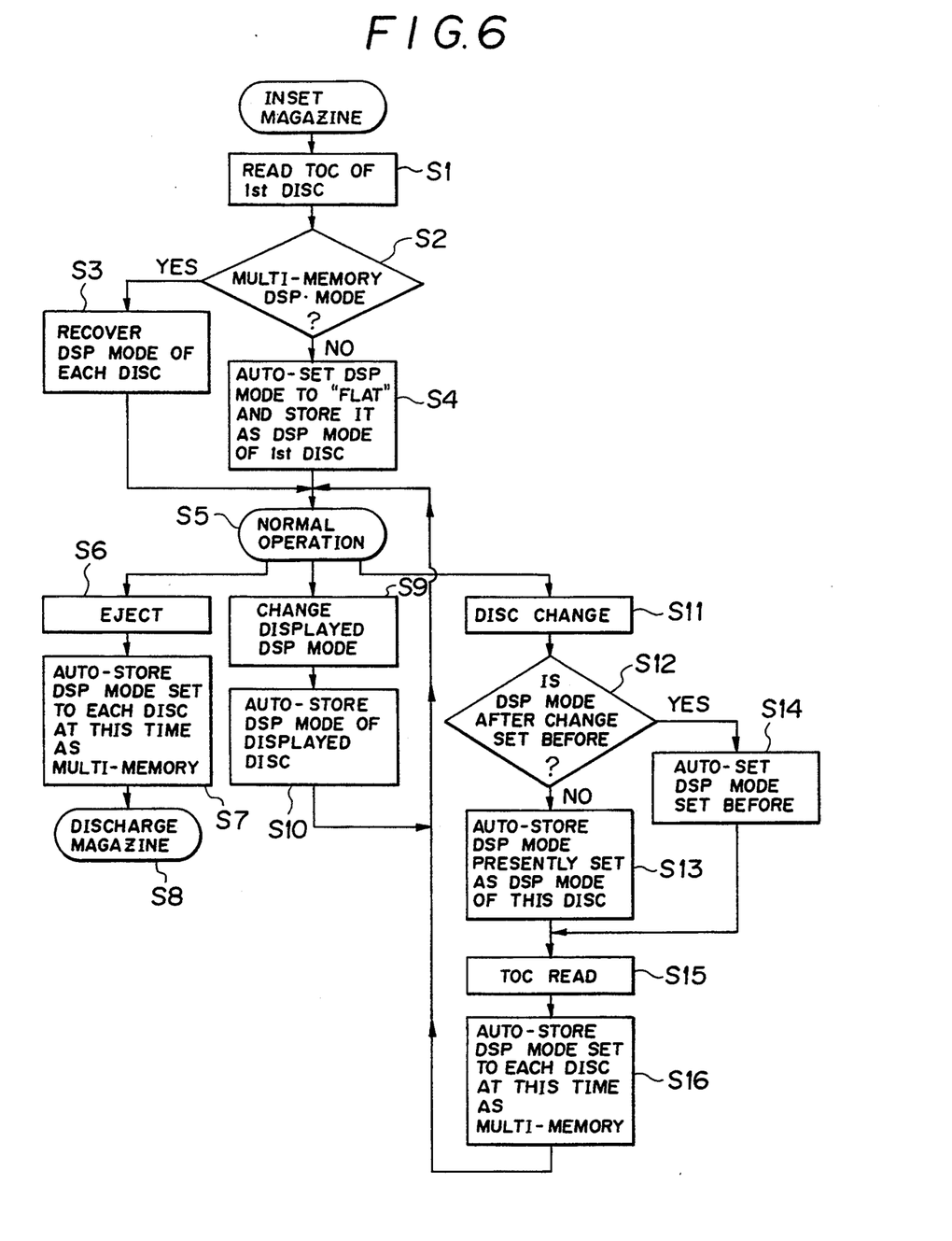
FIG. 6 is a flow chart of operation in the first embodiment.
Figure 7:
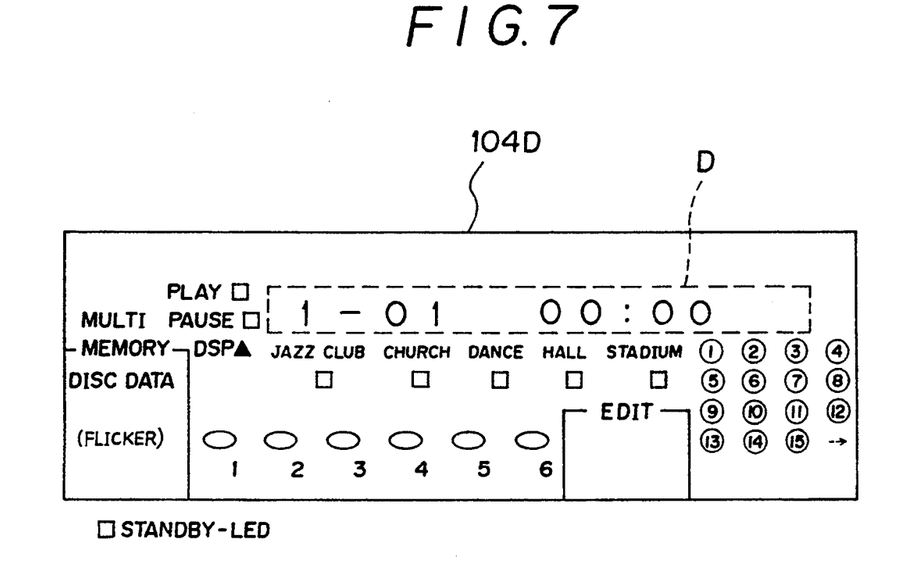
FIG. 7 is a FIG. (2) for explaining another state of operation.
Figure 8:
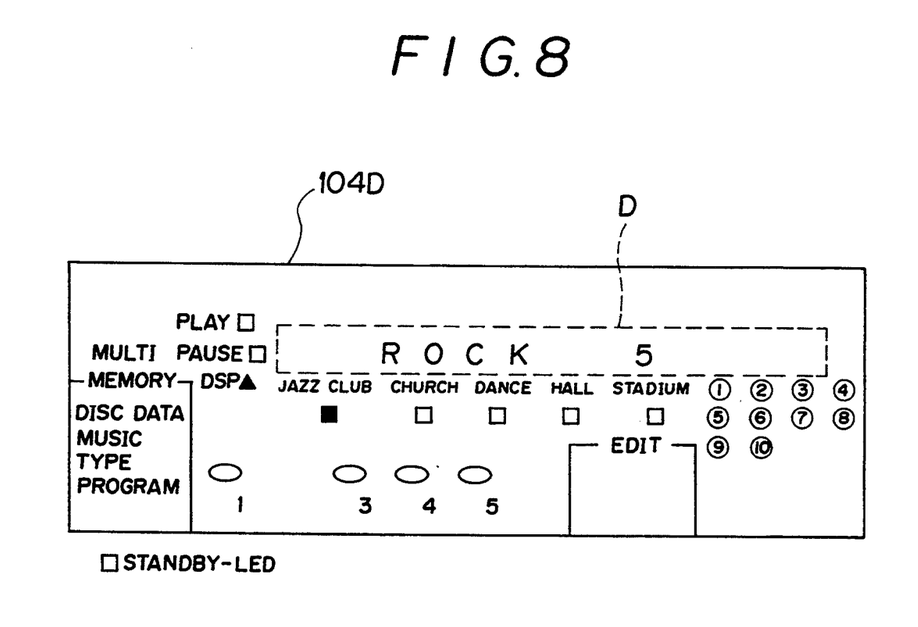
FIG. 8 is a FIG. (3) for explaining another state of operation.
Figure 9:
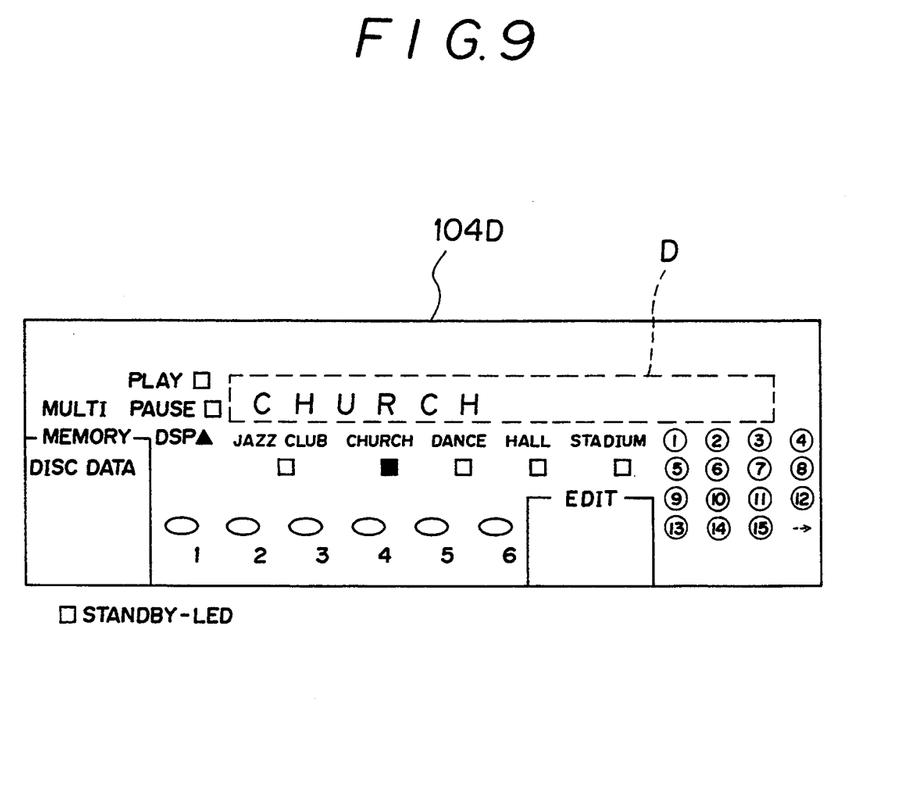
FIG. 9 is a FIG. (4) for explaining another state of operation.

Nextly, the operation of the present embodiment will be explained with reference to an operation flow chart of FIG. 6, and explanation views of FIGS. 7 to 9.

Firstly, the magazine 100 is inserted to the multi CD player 200. Then, the TOC information on the first CD is read, while the display "DISC DATA" on the display panel 104D of the display operation unit 104 is flickered at the lower left portion hereof, as shown in the FIG. 7 (step S1). The magazine identifying data ID is identified and the memory areas MM1 to MMn for registration are searched. It is judged whether the DSP mode data of the corresponding magazine is stored or not (step S2).

In the judgement of the step S2, if the same magazine identifying data ID is not stored and the DSP mode data of the corresponding magazine is not stored, i.e. if the magazine is judged to be inserted for the first time, the TOC information of the read first CD is stored to the play area 10, the DSP mode is automatically set to be the flat mode, as the DSP mode of the first CD (step S4).

In the judgement of the step S2, if the same magazine identifying data ID is stored and the DSP mode data of the corresponding magazine is stored, i.e. if the magazine which has been inserted once is judged to be inserted again, the corresponding TOC data and the DSP mode data are transmitted to the current magazine area CUMM, while the display of "DISC DATA" is being flickered. This transmitted TOC data and DSP mode data are expanded, and recovered to the play area 10. Thereby, the CPU 1 performs the normal reproduction operation on the basis of the TOC data and the DSP mode data in the play area 10 (step S5).

In this case, if the program data is also stored in the corresponding memory area for registration, the display of "PROGRAM" is further lightened (refer to FIG. 7), and the program data is also transmitted to the current magazine area CUMM. This transmitted program data is expanded and recovered to the play area 10. Moreover, if the delete data to delete a portion of the music information recorded on the CD in place of the above mentioned program data at the reproduction operation, i.e. to treat the portion as not existing, is stored, the display of "DELETE" is lightened, and the delete data is transmitted to the current magazine area CUMM. This transmitted delete data is expanded and recovered to the play area 10. Further, if the music type of the CD is stored in addition to the program data or the delete data, the display of "MUSIC-TYPE" is lighted (refer to FIG. 8). As the music type, for example, "ROCK 5" is displayed on the display area D in FIG. 8.

Nextly, the automatic storage of the DSP mode data performed after starting the normal reproduction operation (step S5) will be explained as for the three cases of:

1) When the magazine is ejected,
2) When the DSP mode display is changed, and
3) When the disc change is performed.

These three cases are typical cases in which the continuous stop condition of the reproduction operation of the present CD or the present magazine can be predicted i.e. it is predicted that the present CD or the present magazine will not be reproduced for the time being.

1) When the magazine is ejected.

During the normal reproduction operation (step S5), the ejection button of the displaying and operating unit 104 (not shown in the figure), is depressed (step S6). The DSP mode data, which is set to each CD and is stored in the play area 10 at the time of depressing the ejection button, is compressed and transmitted to the current magazine area CUMM. Nextly, the CPU 1 searches the memory area for registration. If the memory area for registration to which the magazine identifying data ID equal to the magazine identifying data ID in the reproduction control information stored in the current magazine area is stored, exists, the reproduction control information including the DSP mode data of the current magazine area CUMM, is transmitted to the memory area for registration, and the updating process is performed.. After that, the CPU 1 discharges the magazine and ends the process (step S8).

If the memory area for registration does not exist, to which the magazine identifying data CD equal to the magazine identifying data ID of the reproduction control information stored in the current magazine area CUMM is stored, and if the memory area for registration to which no data is recorded exists, the reproduction control information including the DSP mode data of the current magazine area CUMM, is transmitted to the memory area for registration to which no data is recorded. After that, the CPU 1 discharges the magazine 100 and ends the process (step S8).

Thereby, if the same magazine is inserted for the next time, the magazine identifying data ID will be judged to be identified. The TOC data and the DSP mode data with respect to the same magazine are recovered to the current magazine area CUMM and the play area 10 from the memory area for registration, so that it becomes possible to perform the desirable reproduction immediately.

Moreover, in case that the data is already registered to all of the memory area for registration in the above mentioned case, if there is the memory area for registration only for the TOC data, to which the program data, the delete data, and the music type data are not stored, the oldest data in the memory area for registration is cleared. The data of the new magazine is transmitted from the current magazine area CUMM, and the updating process is performed. As the method of identifying the memory area for registration where the data is recorded at the oldest time, there are a method of preparing a domain which records the data at the time of updating of the record in each memory area for registration, and judging on the basis of the data content of this domain, and a method of constituting the memory area for registration to be the FIFO (First In First Out) structure, preparing a pointer by storing the data in the order of updating, and judging according to the pointer.

Further, in case that the data have been registered in all of the memory area for registration, and that either the program data, the delete data, or the music type data are recorded therein, the data which has been registered at the oldest time into the memory area for registration, is cleared. The new data of the magazine is transmitted from the current magazine area CUMM, and the updating process is performed.

2) When the DSP mode display is changed.

When the magazine is inserted into the multi CD player, under the condition where the TOC data of the first sheet has been read, it becomes possible to set the DSP mode for every CD. Namely, the DSP mode of the present CD can be set by changing the DSP mode display of the display unit even at the time of the normal reproducing operation. More concretely, the DSP mode display is changed by use of the displaying and operating unit 104 etc. (step S9). When the DSP mode is set, the DSP mode which is currently displayed on the display area D of the display panel 104D at the moment (FIG. 9, church mode, for example), is automatically stored into the play area 10 as the DSP mode data of the CD reproduced at the present time (step S10). The process shifts to the normal operation again (step S5).

3) When the disc change is performed.

When the instruction to change the disc by depressing the disc change button of the displaying and operating unit 104, which is not shown in the figure (step S11), the CPU 1 investigates the DSP mode data in the play area 10. The CPU 1 judges whether the DSP mode has been set before as for the CD after the disc change or not (step S12).

If the DSP mode has never been set before, the DSP mode data corresponding to the DSP mode currently set, is automatically stored into the play area 10 as the DSP mode data of the present CD (step S13), and the process shifts to the step S15.

If the DSP mode has been set before, the current DSP mode is automatically set to this DSP mode set before (step S14), and the process shifts to the step S15.

Nextly, the TOC data is read out (step S15). The DSP data corresponding to the DSP mode currently set to each CD at this moment, are transmitted to the current magazine area CUMM and stored therein (step S16), and the process shifts to the normal operation again (step S5).

Further, in case that the CD in the magazine which has been already registered into the memory area for registration, is exchanged, added, or removed, the state occurs where it differs from the contents registered in the memory area for registration. Accordingly, when this different CD is reproduced, the disc existence data and the TOC data are automatically updated. In addition, if the program data or the delete data have been already stored, the data are not automatically updated, unless the new data is stored.

As described above in detail, according to the present embodiment, when the reproduction control information such as the DSP mode data are stored, it is not necessary to perform the key input etc. manually by the user for the storing operation, so that the storing operation can be performed easily and reliably.

In the present embodiment, the CPU 1 may be adapted to clear the data contents of the first RAM 2 and/or the second RAM 3 in FIG. 2 when the magazine 100 is discharged in FIG. 1. so that unnecessary data are not remained in these memories.

Second Embodiment

The explanation will be made as for the example case that the disc highlight scan is used as another method of storing the DSP mode of the magazine.

The disc highlight scan is an operation for sequentially performing the reproduction of the portion from 1 minute to 1 minutes and 10 seconds, for example, of the first music of each CD set in the magazine.

If the DSP mode is set during the reproduction operation by this disc highlight scan, it can be stored as the DSP mode data of the CD under reproduction. The DSP mode is also stored by the CD previously reproduced in the same magazine. In case of the CD reproduced later, even if the DSP mode is not set, the same DSP mode data is automatically stored.

Therefore, if the DSP mode is set when the first sheet of the CD is reproduced in the magazine which is reproduced for the first time, and if the reproduction by the disc highlight scan is continued as it is, the same DSP mode is set with respect to all of the CDs in the magazine. The same DSP mode data is stored into the play memory area 10 and the current magazine area CUMM, as well as the memory area for registration.

According to the present embodiment as described above, since the user does not have to perform a special storing operation when the reproduction control information including the DSP mode data of the CD, is stored, the operativity of the CD player is improved. Furthermore, in connection with this, it is not necessary to perform the storage decision operation, for example, the memory key operation, so that the re-storing operation which is to be performed when the storage decision operation is forgotten to be performed, is not necessary.

Only the multi CD player has been explained in each of the above embodiments. However, the present invention can be adapted to other information reproducing apparatuses, such as a LD player and a DAT player.

Moreover, only the case where the DSP mode data is stored automatically, has been explained in each of the above embodiments. However, it is also possible to constitute the CD player to be provided with the key for manual storing operation so that the user can arbitrarily store (register) the data.

Furthermore, in each of the above embodiments, the data is once stored into the play area 10, and after that, the data is transmitted to the current magazine area CUMM or the memory area MM1 to MMn for registration which is a non-volatile RAM, on the necessary occasions. However, it is also possible to constitute the apparatus so that it may write the data directly into the current magazine area CUMM or the memory area MM1 to MMn for registration, without preparing the play area 10. In this case, the compression and the expansion of the data are not necessary to be performed.

Furthermore, the various data, which are reproduction control information, are stored to the side of the multi CD player, in each of the above embodiments. However, it is possible to constitute the apparatus so that the data may be stored to the side of the magazine.

Moreover, the multi CD player in which the two or more CDs are concurrently accommodated in each of the above embodiments. However, it is possible to apply the present invention to an information reproducing apparatus which can reproduce only a single recording medium, for example, the single CD player which can reproduce a single CD, so that the operativity of the information reproducing apparatus is improved.

Figure 10:
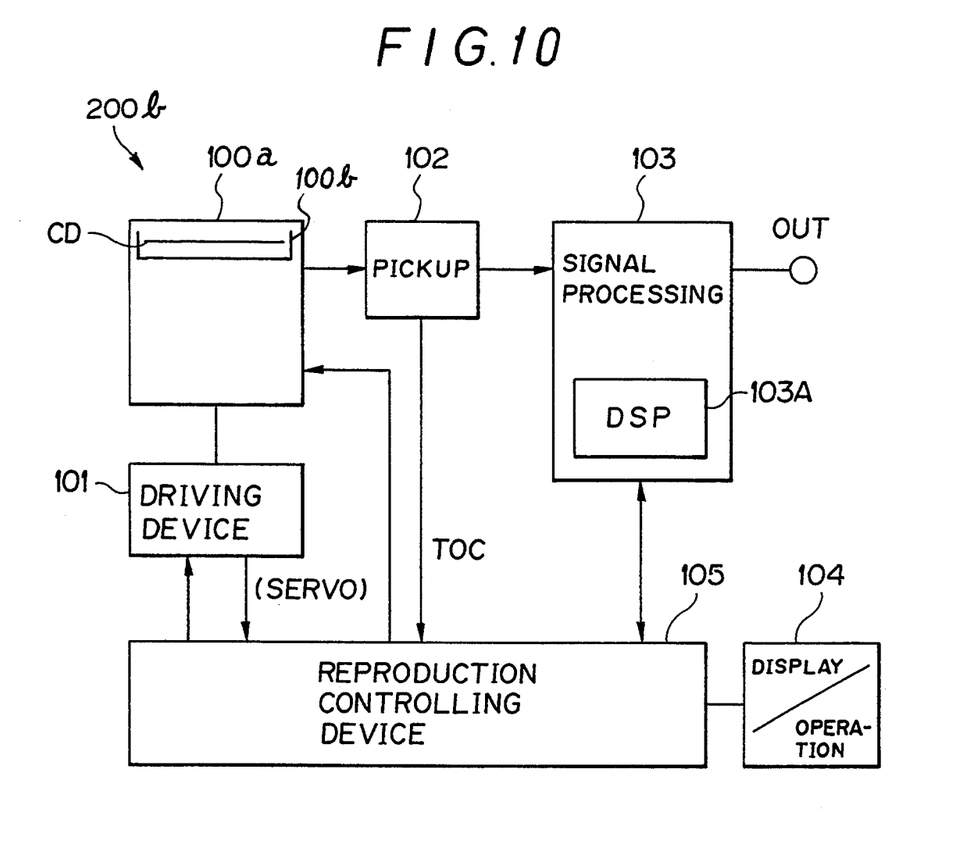
FIG. 10 is a block diagram showing an outline constitution of a single CD player of an embodiment.

FIG. 10 shows another embodiment of the present invention which is such a single player type. In FIG. 10, the same constitutional elements as those in FIG. 1, carry the same reference numerals and the explanations thereof are omitted.

In FIG. 10, a single CD player 200b is provided with a device 100a for mounting a single CD on a tray 100b, in place of the magazine 100 of the first embodiment of FIG. 1. The tray 100b is adapted to be opened and closed under the control of the reproduction controlling device 105. In this embodiment, the CPU in the reproduction controling device 105 may be adapted to clear the data contents of the first RAM and/or second RAM in the reproduction controling device 105, when the operation indication of discharging the CD is detected or when the tray 100b is opened and closed.

According to the present embodiment, the reproduction device reproduces the recording medium on the basis of the reproduction control information which is stored in the first memory. The memory controlling device stores the reproduction controlling information, which is stored in the first memory, into the second memory of non-volatile type, in case that the operation indication or the operation condition, which anticipates at least the continuous stop condition of the reproduction operation of the CD, is detected during the reproduction operation. Thus, the reproduction control information on each CD is easily and certainly stored, without the necessity that the user performs a complicated manual process. Furthermore, this reproduction control information can be used for the reproduction of the same CD for the next time, so that the storing operation does not have to be repeated and the reproduction can be easily enjoyed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information reproducing apparatus, to which a recording medium having record information and table of contents information of the record information is mounted, for controlling a reproduction operation of the record information on the basis of the table of contents information, said apparatus comprising:

an operation input means by which various command data are inputted;

a first memory for temporarily storing reproduction control information including the table of contents information for performing the reproduction operation;

a reproduction means for reproducing said recording medium according to the inputted command data;

a second memory of non-volatile type for storing the reproduction control information in correspondence with said recording medium; and a memory control means coupled to said operation input means and said reproduction means, for storing into said second memory the reproduction control information stored in said first memory, when at least one of the inputted command data and an operation condition of said reproduction means indicate a continuous stop condition of the reproduction operation, said reproduction means to reproduce record information on said recording medium on the basis of the reproduction control information stored in said second memory if the reproduction control information of the recording medium to be reproduced is stored in said second memory, and on the basis of the reproduction control information stored in said first memory if the reproduction control information of the recording medium to be reproduced is not stored in said second memory.

2. An apparatus according to claim 1, wherein said apparatus is adapted to accommodate a plurality of recording media and continuously reproduce said recording media.

3. An apparatus according to claim 2, comprising a magazine for packing said recording media therein, and an auto-changer for exchanging said recording media in said magazine to be reproduced.

4. An apparatus according to claim 1, wherein said reproduction means comprises an optical pickup, and a signal processing device.

5. An apparatus according to claim 1, further comprising a display means for displaying various data indicating a condition of the reproduction operation.

6. An apparatus according to claim 1, wherein the reproduction control information includes a DSP mode data, and said reproduction means is adapted to perform a DSP mode operation according to the DSP mode data.

7. An apparatus according to claim 1, wherein said memory control means is adapted to compress the reproduction control information when said memory control means stores the reproduction control information into said second memory.

8. An apparatus according to claim 1, wherein said memory control means is adapted to store the reproduction control information into an area in said second memory where no data is recorded.

9. An apparatus according to claim 1, wherein said memory control means is adapted to store the reproduction control information into an area in said second memory where an oldest data is recorded.

10. An apparatus according to claim 1, wherein said memory control means is adapted to recover the reproduction control information, which is stored in said second memory, to said first memory.

11. An apparatus according to claim 3, wherein said memory control means is adapted to clear data content of said first and second memories when said magazine is discharged.

12. An apparatus according to claim 1, wherein said apparatus is a single player type and provided with a tray for mounting the recording medium, and said memory control means is adapted to clear data contents of said first and second memories when an operation indication of discharging the recording medium is detected or when said tray is opened and closed.

* * * * *